US005887053A

United States Patent [19]

McGough

[11] Patent Number: 5,887,053

[45] Date of Patent: Mar. 23, 1999

[54] COIN RETURN ANTI-STUFFING APPARATUS AND METHOD

[75] Inventor: Gerald B. McGough, Huntsville, Ala.

[73] Assignee: Quadrum Telecommunications, Inc., Huntsville, Ala.

[21] Appl. No.: 937,341

[22] Filed: Sep. 20, 1997

Related U.S. Application Data

[60] Provisional application Nos. 60/042,005 Apr. 16, 1997 and 60/026,500 Sep. 23, 1996.

[51] Int. Cl.[6] .................................................... H04M 17/06

[52] U.S. Cl. ............................ 379/145; 379/150; 232/60; 232/57.5; 194/202

[58] Field of Search .................................... 379/145, 146, 379/147, 148, 150; 194/202–204; 232/57.5, 58, 59, 60

[56] References Cited

U.S. PATENT DOCUMENTS

| | | | |
|---|---|---|---|
| 4,946,095 | 8/1990 | Anello et al. | 232/57.5 |
| 5,361,979 | 11/1994 | Anello et al. | 232/57.5 |
| 5,400,396 | 3/1995 | Hsu | 379/150 |
| 5,596,630 | 1/1997 | Hsu | 379/145 |
| 5,727,054 | 3/1998 | Anello et al. | 379/145 |
| 5,787,158 | 7/1998 | Anello et al. | 379/145 |

FOREIGN PATENT DOCUMENTS

| | | |
|---|---|---|
| 0 062 972 A | 10/1982 | European Pat. Off. . |
| 2 135 654A | 12/1972 | France . |
| Q 05462 | 3/1916 | United Kingdom . |
| 1340 319 | 12/1973 | United Kingdom . |
| PCT/US97/ 16684 | 6/1998 | WIPO . |

*Primary Examiner*—Paul Loomis
*Attorney, Agent, or Firm*—Arthur A. Gardner & Associates, P.C.

[57] ABSTRACT

A coin return apparatus, for use with a pay telephone, which provides a discontinuous coin return path between the coin return structure and the coin discharge opening of the pay telephone and which resists “stuffing”, “stringing”, and “pinning”. The coin return apparatus includes a housing which is mountable within the pay telephone and a movable door mounted to the housing. The housing includes a chamber therein and a first opening which is communicable with a passageway of a coin return structure of the pay telephone and which is selectively communicable with the chamber. The housing further includes a second opening which is communicable with the environment about the pay telephone and which is selectively communicable with the chamber. The movable door is movable between first and second positions relative to the housing. The presence of the movable door in the first position enables removal of coins present in the chamber through the second opening of the housing and disables passage through the first opening from the chamber. The presence of the movable door in the second position enables the delivery of coins into the chamber through the first opening and disables passage through the second opening to the chamber.

30 Claims, 13 Drawing Sheets

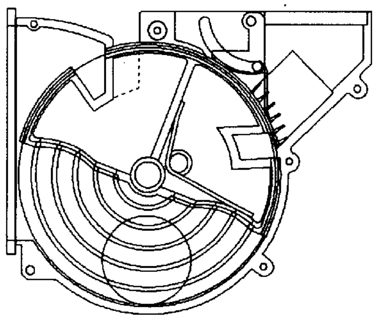
FIG. 7
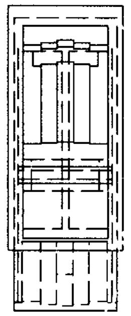
FIG. 7A
FIG. 8
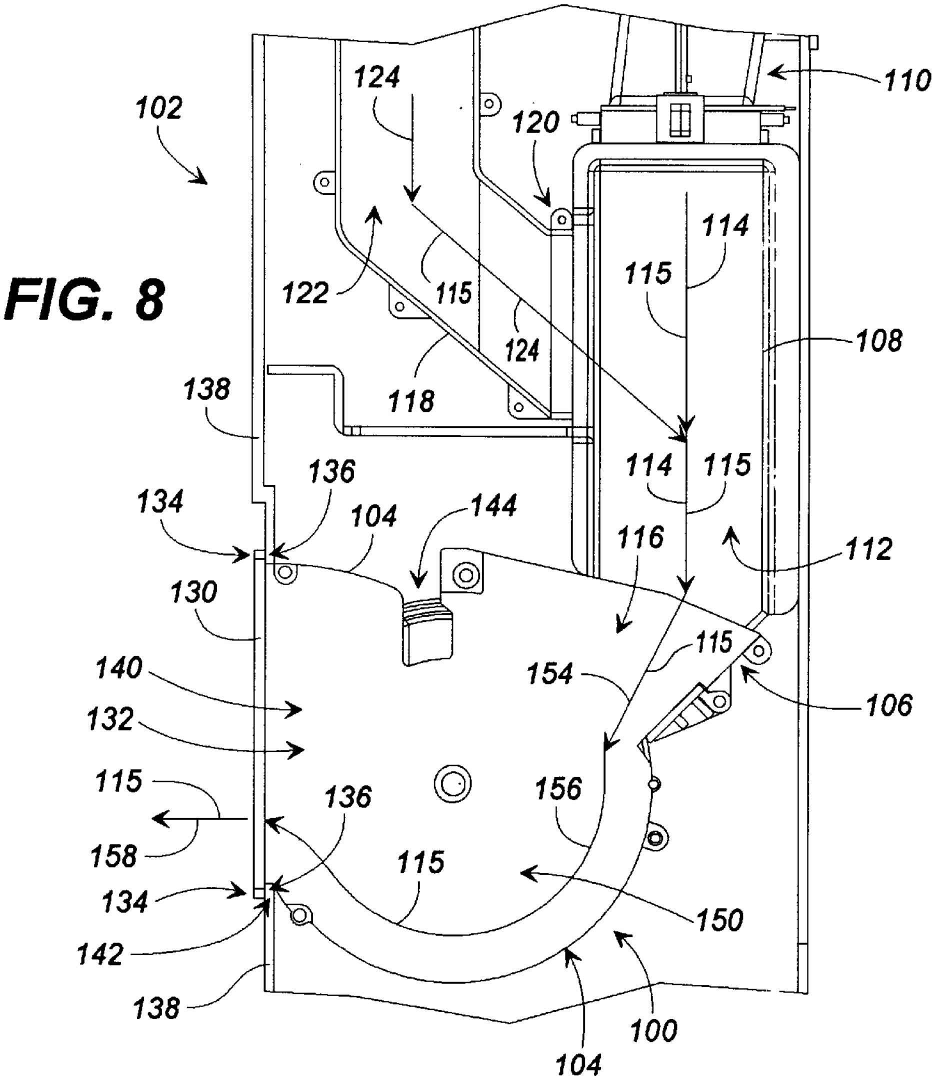

COIN RETURN ANTI-STUFFING APPARATUS AND METHOD

This application claims the benefit of U.S. Provisional Application(s) No(s).:

| APPLICATION NO(S).: | FILING DATE |
|---|---|
| 60/042,005 | 16 April 1997 |
| 60/026,500 | 23 September 1996. |

FIELD OF THE INVENTION

The present invention relates to pay telephones and more particularly, to a coin return apparatus and method for protecting pay telephones from theft and/or vandalism.

BACKGROUND OF THE INVENTION

In general, the operation of a typical pay telephone involves the receipt of coins deposited in the pay telephone by a user of the telephone and the establishing of a communication session between the pay telephone's user and a called party associated with a telephone number input by the user. If, for some reason, the communication session cannot be established (i.e., due to a wrong number being input by the user, the called party does not answer, etc.), the user either hangs-up the telephone's handset or operates the telephone's hookswitch and the deposited coins are released by the telephone's coin escrow device (i.e., which holds deposited and accepted coins until a communication session is established successfully) for removal from the pay telephone by the user through a coin return opening generally located near the bottom of the pay telephone. Coins are also sometimes released from the telephone's coin acceptor/rejector by user operation of the telephone's coin release lever. In order to reach the coin return opening, the returned coins generally travel through some sort of coin return chute, or channel, descending within the pay telephone between the coin escrow device, the coin acceptor/rejector, and the coin return opening.

Unfortunately, many resourceful thieves have discovered that it is possible to abscond with the returned coins by blocking, or "stuffing", the chute with a foreign object positioned at a location sufficiently far up into the chute so as to avoid ready detection and removal by a representative of the pay telephone's owner. Then, whenever coins are released by the coin escrow device or coin acceptor/rejector, they are stopped from falling through the entire length of the chute to the coin return opening by the foreign object and are, instead, trapped within the chute above the foreign object to await collection by the thief. In order to collect the trapped coins, the thief merely removes the foreign object at a later time, thereby enabling the released, but trapped coins to continue their fall through the chute to the coin return opening where the thief removes and pockets the coins.

Over the years, pay telephone owners have discovered that the thieves employ a number of techniques to "stuff" a pay telephone. All of the techniques commonly involve the insertion of a foreign object which is, typically, a piece of cloth, paper, or other flexible material into the chute, but vary somewhat in the way in which the foreign object is introduced into the chute. For instance, one technique, known as traditional "stuffing", involves inserting a foreign object into the coin return opening and then pushing the foreign object upward into position within the coin return chute with a reasonably stiff, yet bendable piece of wire. A second technique, known as "stringing", involves the preparation of a specially-modified coin, or slug, and its subsequent introduction into the coin receiving slot near the top of the pay telephone. Prior to insertion of the modified coin, the thief drills a hole through the coin and secures a thin first string to the modified coin by passing a first end of the first string through the hole and then by knotting the first end of the string to retain the modified coin. Once inserted into the coin acceptance slot, the thief holds on to a second end of the first string while the modified coin and a portion of the first string descend through the pay telephone with the modified coin either being rejected by a coin acceptor/rejector mechanism and directed into the coin return chute, or being accepted by the coin acceptor/rejector mechanism and held by the telephone's coin escrow device until released into the coin return chute by operation of the telephone's coin release lever by the thief. In either case, the modified coin falls through the chute to the coin return opening where the thief replaces the modified coin at the first end of the first string with a foreign object and a second string having a first end attached to the foreign object. The thief, pulling on the second end of the first string, pulls the foreign object upward into the coin return chute until the second end of the second string is barely visible in the coin return opening. Thereafter, subsequently returned coins are trapped within the coin return chute above the foreign object. The thief then returns to the pay telephone after a period of time, accesses the second end of the second string through the coin return opening, and pulls on the second end of the second string to remove the foreign object via the coin return opening. Once the foreign object is removed, the previously trapped coins descend through the coin return chute to the coin return opening for removal by the thief.

In addition to enabling the theft of released coins from a pay telephone, stuffing and/or attempted stuffing of a pay telephone by a thief can cause damage to various internal components of the pay telephone and can render the telephone inoperable. Damage is also often caused by vandals whose primary desire is to see if they can render a pay telephone inoperable, rather than to steal money from the pay telephone. Like the thieves, vandals employ a number of different techniques to vandalize a pay telephone. One of the more popular techniques seems to be the introduction and subsequent detonation of fireworks within the pay telephone's coin return chute.

Shock waves, created by the detonation, travel upward through the coin return chute generally damaging the chute and various other components of the pay telephone.

Prior efforts, although extensive, to prevent the stuffing and vandalism of pay telephones have not been completely effective. Accordingly, a need yet remains in the art for a tamperresistant coin return apparatus and method which prevent stuffing and damage due to vandalism. It is to the provision of such a coin return apparatus and method that the present invention is primarily directed.

SUMMARY OF THE INVENTION

Briefly described, in a preferred form the present invention comprises a coin return apparatus for use with a pay telephone. The coin return apparatus includes a housing which is mountable within the pay telephone and a movable door mounted to the housing. The housing includes a chamber therein and a first opening which is communicable with a passageway of a coin return structure of the pay telephone and which is selectively communicable with the chamber. The housing further includes a second opening which is communicable with the environment about the pay telephone and which is selectively communicable with the chamber. The movable door is movable between first and second positions relative to the housing. The presence of the movable door in the first position enables removal of coins present in the chamber through the second opening of the housing and disables passage through the first opening from the chamber. The presence of the movable door in the second position enables the delivery of coins into the chamber through the first opening and disables passage through the second opening to the chamber.

Preferably, the coin return apparatus further comprises a means for hindering movement of a foreign object through the first opening of the housing. Also preferably, the coin return apparatus further comprises a means for impeding the wedging of a foreign object between the housing and the movable door. Also preferably, the movable door is pivotally connected to the housing and comprises a revolving door.

In another preferred form, the invention comprises a coin return apparatus having a first member fixedly mountable within the pay telephone and a second member which is cooperative with and movable relative to the first member. The first and second members define a chamber therebetween and the chamber is selectively communicable with a passageway with a coin return structure of the pay telephone and is also selectively communicable with the environment about the pay telephone. The second member places the chamber in exclusive communication with the passageway of the coin return structure at a first time and places the chamber in exclusive communication with the environment at a second time different from the first time. The second member also opposes communication between the passageway of the coin return structure and the environment at a same time.

Preferably, the first member and the second member are coupled for relative rotary motion therebetween. Also preferably, the coin return apparatus further includes a biasing means connected to the first member and the second member. The biasing means causes relative rotary motion between the first and the second member and returns the chamber into communication with the environment about the pay telephone after the chamber has been out of communication with the environment about the pay telephone. Also preferably, the coin return apparatus is insertable into the pay telephone through a coin return opening in a housing of the pay telephone. The coin return apparatus, preferably accommodates coins having a maximum size dimension as large as thirty-five millimeters.

A coin return according to the present invention has numerous advantages. Firstly, it is resistant to "stuffing", "pinning", and "stringing". Thus, it is extremely vandal-resistant. A key aspect of this vandal resistance is that direct access from outside of the pay telephone to the coin hopper is prevented. Rather, when the movable door is in the coin retrieval position, access to the coin hopper is blocked and conversely when the movable door is in the coin delivery position, access to the coin return chamber is blocked. Furthermore, the solution is elegant in its simplicity, having a minimum number of moving parts and having a low degree of complexity. Thus, the design is durable and easily manufactured and installed in the field.

Accordingly, it is an object of the present invention to provide a coin return which resists stuffing.

It is another object of the present invention to provide a coin return which prevents direct access to a coin hopper portion thereof.

It is another object of the present invention to provide a vandal resistant coin return which is simple in its construction, durable in use, and economical in manufacture.

These and other objects, features, and advantages of the present invention will become more apparent upon reading the following specification in conjunction with the accompanying drawing figures.

BRIEF DESCRIPTION OF THE DRAWINGS

FIG. 2 through FIG. 7 are right side, elevational, schematic views of the coin return device of FIG. 1, showing the coin return device in various stages of operation.

FIG. 2A through FIG. 7A are front, elevational views of the coin return device of FIG. 1, shown in stages of operation corresponding to FIG. 2 through FIG. 7.

FIG. 8 is a right side, elevational view of a coin return device, according to a second preferred embodiment of the present invention, showing the coin return device installed within a pay telephone.

DETAILED DESCRIPTION OF THE PREFERRED EMBODIMENTS

Figure 1A:
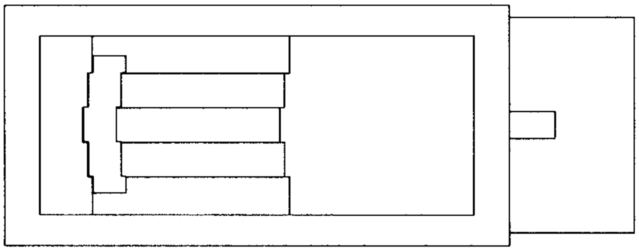
FIG. 1A is a front, elevational view of the coin return device of FIG. 1.
Figure 1:
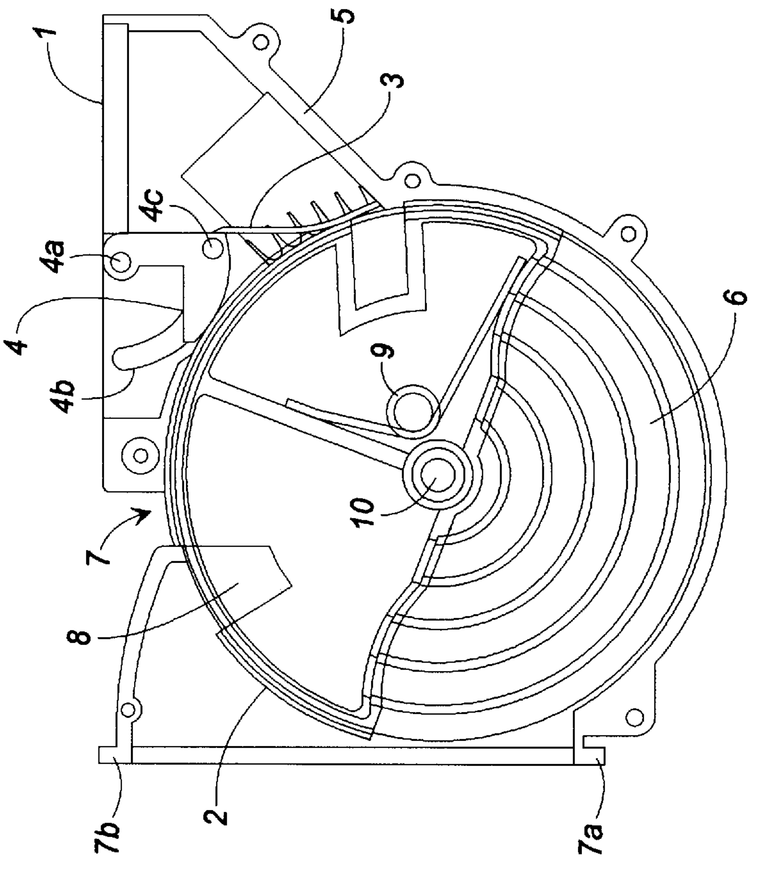
FIG. 1 is a right side, elevational, schematic view of a coin return device according to a first preferred embodiment of the invention.
Figure 4:
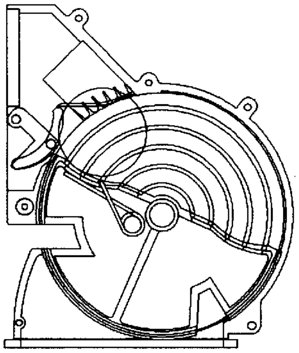
Figure 3A:
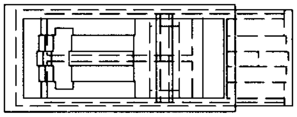
Figure 3:
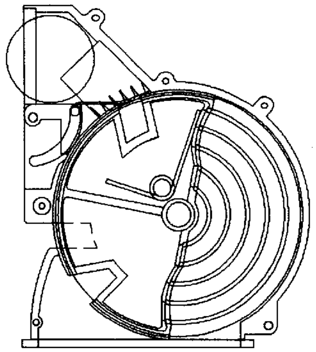
Figure 2A:
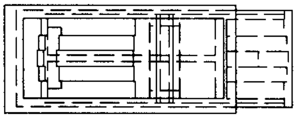
Figure 2:
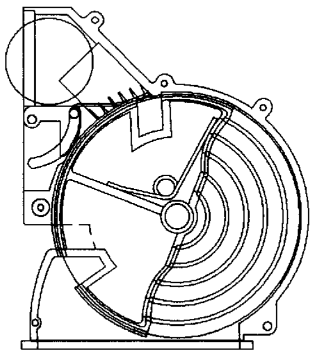
Figure 6A:
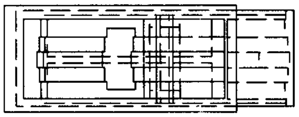
Figure 6:
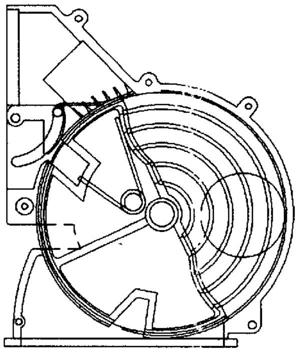
Figure 5A:
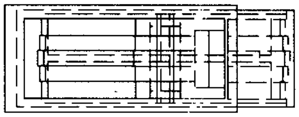
Figure 5:
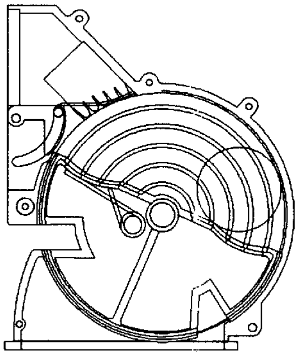
Figure 4A:
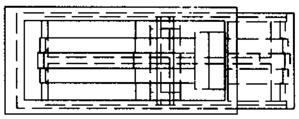

Referring now to the drawing figures, wherein like reference numerals represent like parts throughout the several views, FIG. 1 shows a coin return apparatus according to a first preferred embodiment of the invention. The coin return includes a housing which defines an upper hopper 1. The housing is configured to be front mounted in a conventional pay telephone and mounted beneath a coin validation mechanism. The housing defines an interior opening for receiving a revolving door (i.e., movable door means) 2. The revolving door 2 acts similarly to an airlock in that it prevents direct access from the outside of the pay telephone to the coin hopper 1. This prevents a vandal or thief from passing a foreign object up into the coin hopper, such as to stuff the coin hopper for subsequent theft. As seen in FIG. 1, the revolving door 2 is roughly in the shape of one-half of a circle. In this way, depending upon the rotational position of the door, the door 2 can occlude a space or passageway or provide access to a space or passageway.

A trap door 3 is positioned at the bottom of the coin hopper 1 for engaging the solid portion of the revolving door 2. The trap door 3 prevents the reverse flow of foreign objects or coins and prevents explosive forces from being carried along through the coin hopper and back up into the coin validation unit above. The trap door 3 is secured to, and pivots with, a blocking door 4 which operates to retain foreign objects (i.e., stuffed material). The blocking door 4 is pivoted by a pivot pin 4*a* and its pivotal motion is limited by a slot 4*b* and a pin 4*c*. The blocking door has vent holes formed therein to allow explosive gases and explosive forces to pass therethrough and prevent damage.

A string cutter 5 is provided at a lower portion of the coin hopper 1 generally adjacent the trap door 3 (with the trap door in its closed position as shown in FIG. 1). The string cutter 5 operates to cut strings which may be used by vandals or thieves in an attempt to drag stuffing material back up into the coin path.

The coin return chamber 6 includes concentric grooves (with lands formed therebetween) formed in the housing. These grooves and lands are also formed in the solid portion of the revolving door. The tight fit between the various grooves and lands prevents pins, of any diameter, from being inserted in order to jam the revolving door and also helps to keep coins from inadvertently jamming the revolving door. The grooves and lands prevent the insertion of shims of any substantial width, or strength. Note that the geometry of the coin return chamber 6, the housing, and the revolving door does not define ledges, particularly hidden ledges, against which a pin or shim can be wedged. Note also that the revolving door can be forced, by the user, in either direction to clear a weak pin or shim.

The housing includes a slot or deep notch 7 for allowing the coin return to be slipped into position in a pay telephone, the coin return being installed from the front of the telephone housing. The coin return housing also includes a small hook 7*a* for engaging a face portion of the pay telephone housing and a flange 7*b* for engaging another portion of the face of the pay telephone housing.

The revolving door 2 also includes a finger grip slot 8 for manual user operation of the revolving door. Furthermore, the revolving door 2 includes a return spring 9. The revolving door pivots about a pivot axle or pivot pin 10. Still referring to FIG. 1, one can see that the finger grip slot 8 allows the user to rotate the revolving door 2 in a counter-clockwise direction, and that the return spring 9 operates to return the revolving door 2 in the clockwise direction.

Operation of the coin return of the first preferred embodiment is quite straightforward. In use, a user would insert a finger into the finger slot 8 of the revolving door 2 and rotate the door downwardly, allowing coins to fall into the revolving door chamber 6. Thereafter, the user would release the revolving door 2, allowing the return spring 9 to return the revolving door to the position shown in FIG. 1. The user would then reach a finger or fingers into the chamber 6 to retrieve coins deposited therein. These operational steps are depicted in greater detail in FIGS. 2, 2A through 7, 7A.

The coin return according to the present invention is resistant to "pinning" in which jam pins and other objects otherwise would be inserted alongside the revolving door so that the user cannot operate it. The novel coin return is also resistant to "stringing" in which a string is tied to a coin and the coin is inserted into the pay station to allow it to be rejected and then stuffing material is tied to the coin end of the string and dragged back up into the coin path. The invention is resistant to such vandalism. The invention also is resistant to simply stuffing of material up into the hopper and to stuffing by fireworks.

In accordance with a second, most preferred embodiment of the present invention, FIG. 8 schematically displays a coin return device 100 mounted within a pay telephone 102. The coin return device 100, viewed from its right side 174, comprises a housing 104 having an entrance chute portion 106 (also referred to herein as the entrance chute 106) which resides partially beneath one end of a coin return chute 108 and extends, from the remainder of the housing 104, in a generally upward and rearward direction. The other end of the coin return chute 108 to a coin escrow device 110. The coin return chute 108 defines a channel 112 extending therein which descends within the coin return chute 108 to direct return coins along a portion 114, indicated by arrow 114, of a coin return path 115 into a first, uppermost opening 116 of the entrance chute portion 106 of the coin return device 100. A coin reject chute 118 descends within the pay telephone 102 between a coin validator device, not shown, (also referred to herein as a coin acceptor/rejector) at an upper end (not visible) and connects to the coin return chute 108 at a lower end 120 which is elevationally above the entrance chute 106 of the coin return device 100. The coin reject chute 118 defines a channel 122 therein which directs return coins along a portion 124, indicated by arrow 124, of the coin return path 115 into channel 112 of the coin return chute 108.

The housing 104 of the coin return device 100 also has a flange 130 which defines a discharge opening 132 therethrough. The flange 130 has a first face 134 which is visible when the pay telephone 102 is viewed from its front and a second face 136 which resides adjacent to and partially overlaps a front face plate 138 of the pay telephone 102. The flange 130 and the portion of the housing 104 near the flange 130 cooperate to hold the coin return device 100 within a hole 140 of the front face plate 138 of the pay telephone 102. Note that the flange 130 and the portion of the housing 104 near the flange 130 define a hook-like cut-out 142 which receives a portion of the front face plate 138 of the pay telephone 102 and aids in securing the coin return device 100 to the pay telephone 102. The housing 104 additionally has a notch 144 which temporarily receives a portion of the front face plate 138 near the top of hole 140 during installation of the coin return device 100, through hole 140, from the front of the pay telephone 102.

Between flange 130 and the entrance chute 106, the housing 104 defines a chamber 150 therein which has a substantially circular shape when viewed from a side of the coin return device 100. The chamber 150 communicates, at appropriate times during operation of the coin return device 100 as described below, with the discharge opening 132 and a second, lowermost opening 152 of the entrance chute 106 defined by the housing 104. The entrance chute 106 and the portion of the housing 104 about the chamber 150, during operation, generally direct return a coins along portions 154, 156, indicated respectively by arrows 154, 156, of the coin return path 115 through the coin return device 100 for subsequent removal by the user via the discharge opening 132 and portion 158 of the coin return path 115.

Figure 9:
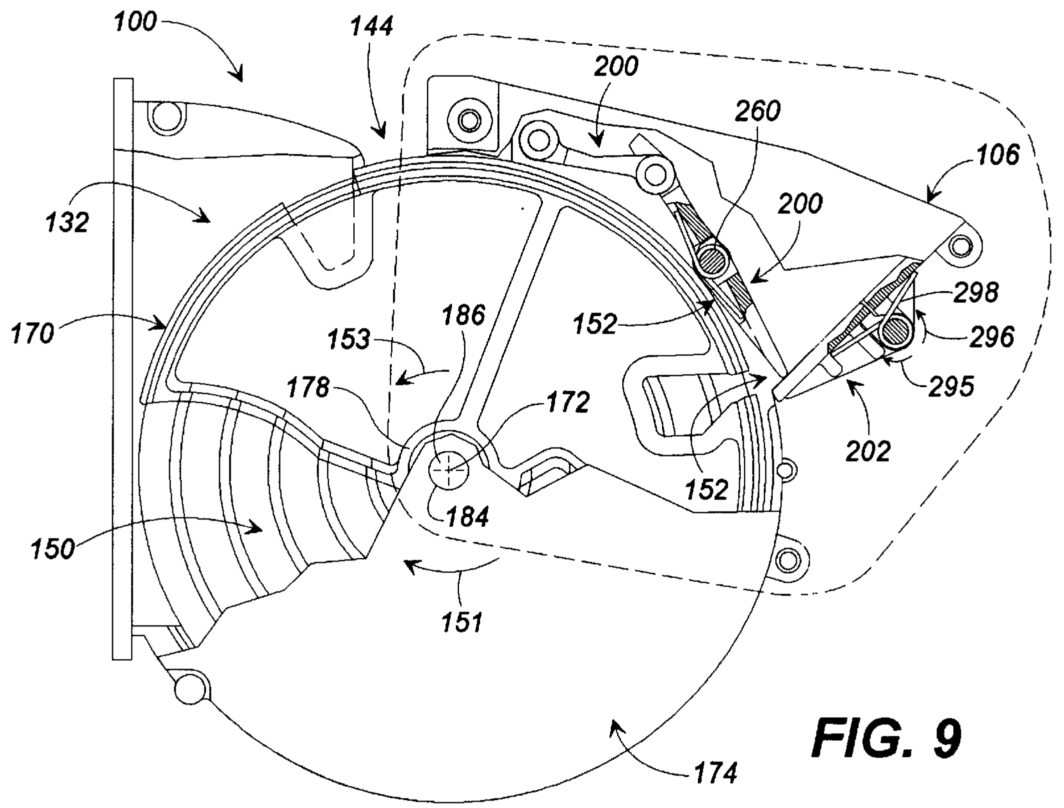
FIG. 9 is an isolated, partially cut-away, right side, elevational view of the coin return device of FIG. 8.
Figure 10:
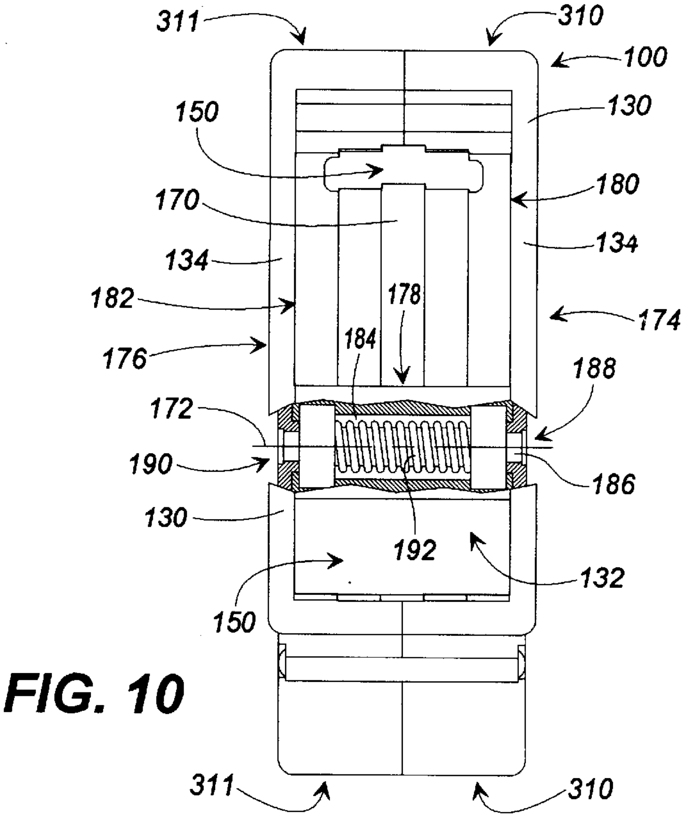
FIG. 10 is an isolated, partially cut-away, front, elevational view of the coin return device of FIG. 8.

Referring now to FIGS. 9 and 10, the coin return device 100 further comprises a movable, revolving door 170 (described in more detail below with reference to FIGS. 30–35) which resides within the chamber 150 and which is rotatable, within the chamber 150 (i.e., in the clockwise and counterclockwise directions indicated by arrows 151, 153, respectively), relative to an axis 172 extending between sides 174, 176 of the housing 104 and through chamber 150. The revolving door 170 has a core portion 178 which extends between sides 180, 182 of the revolving door 170 and which defines a bore 184 which also extends between sides 180, 182. A rod 186 extends in the direction of axis 172 within the bore 184 and through holes 188, 190 defined, respectively, by sides 174, 176 of the housing 104. A spring 192 wraps about the rod 186 and biases the revolving door 170 relative to the housing 104 in a first position, shown in FIGS. 9, 10, 11, and 36, where the chamber 150 and the discharge opening 132 are in communication and where the chamber 150 and the second opening 152 of the entrance chute 106 are not in communication.

Figure 12:
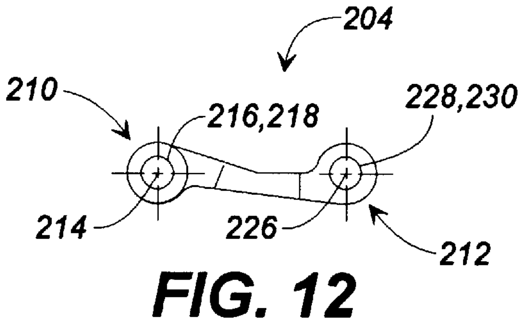
FIG. 12 is an isolated, left side, elevational view of a first segment of the folding door of FIGS. 9 and 11.
Figure 13:
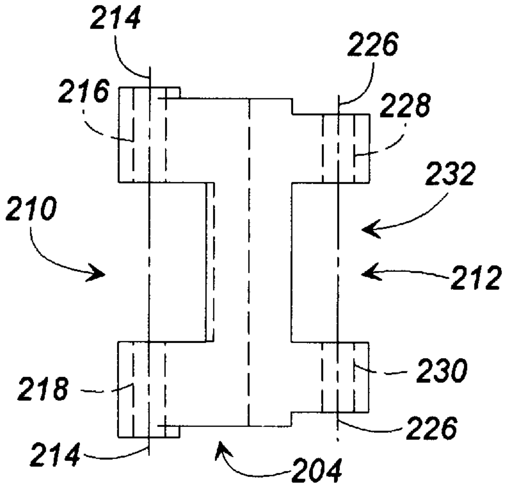
FIG. 13 is an isolated, top, plan view of the first segment of the folding door of FIG. 12.
Figure 14:
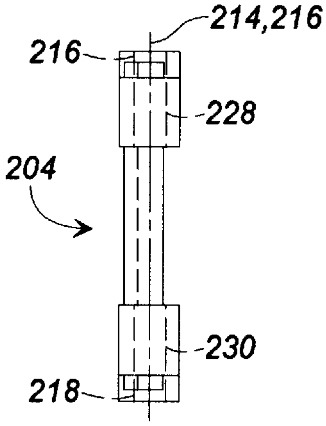
FIG. 14 is an isolated, back, elevational view of the first segment of the folding door of FIG. 12.
Figure 15:
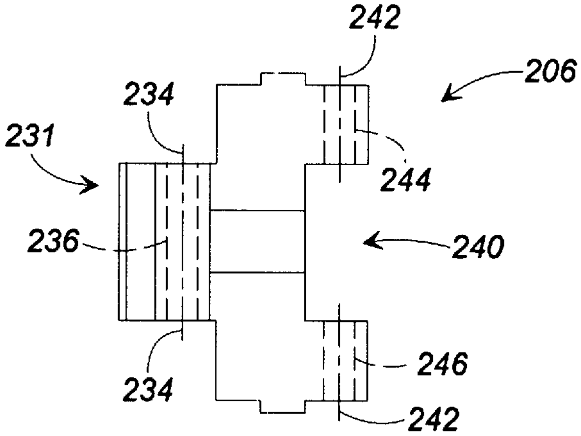
FIG. 15 is an isolated, top, plan view of a second segment of the folding door of FIGS. 9 and 11.
Figure 16:
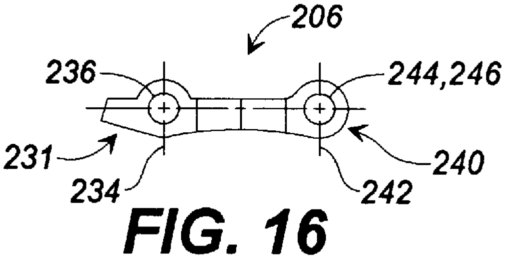
FIG. 16 is an isolated, right side, elevational view of the second segment of the folding door of FIG. 15.
Figure 17:
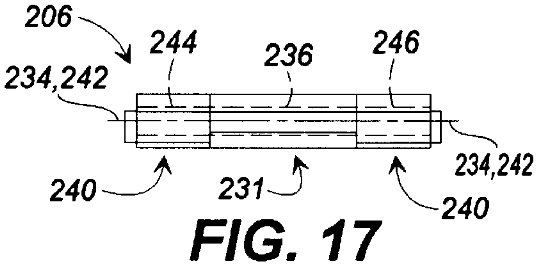
FIG. 17 is an isolated, front, elevational view of the second segment of the folding door of FIG. 15.
Figure 18:
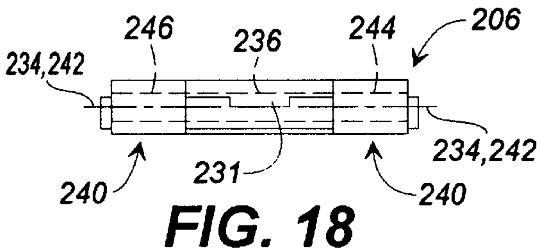
FIG. 18 is an isolated, back, elevational view of the second segment of the folding door of FIG. 15.

The coin return device 100, according to the preferred embodiment, further comprises a folding door 200 and a trap door 202. The folding door 200, as displayed in FIGS. 9 and 11, resides within the entrance chute 106 to cover and uncover the second opening 152 of the entrance chute 106. The folding door 200 includes first, second, and third segments 204, 206, 208 which reside between sides 174, 176 of the housing 104. The first segment 204 (see FIGS. 12–14 for detailed views) has a first end 210 and a second end 212 distant from the first end 210. The first end 210 defines an axis 214 extending therethough and defines bores 216, 218 about the axis 214. A rod 220 extends through bores 216, 218 and between recesses 222, 224 defined, respectively, by sides 174, 176 of the housing 104 to position the first segment 204 of the folding door 200 and to enable rotation of the first segment 204 relative to axis 214. Similar to the first end 210 of the first segment 204 of the folding door 200, the second end 212 of the first segment 204 defines an axis 226 extending therethrough and defines bores 228, 230 about axis 226.

Figure 11:
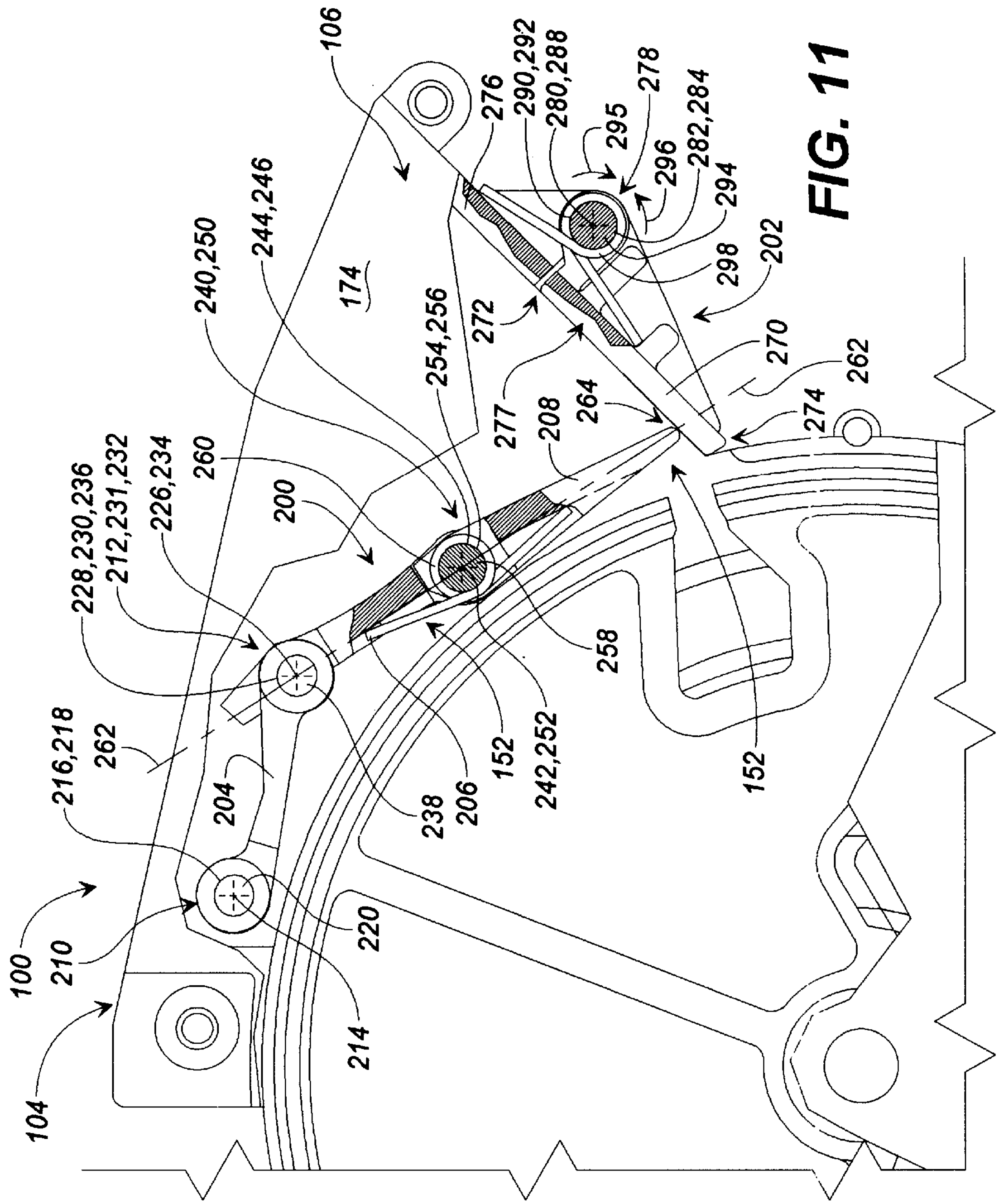
FIG. 11 is an enlarged view of a portion of FIG. 9, showing a folding door and a trap door of the coin return device of FIG. 9.

The second segment 206 (see FIGS. 15–18 for detailed views) of the folding door 200 defines a tongue 231 portion which is received within a fork portion 232 of the first segment 204. The tongue portion 231 defines an axis 234 extending therethrough and a bore 236 extending therethrough about axis 234. As seen in FIG. 11, axis 226 of the second end 212 of the first segment 204 coaxially aligns with axis 234 of the second segment 206 of the folding door 200. A rod 238 extends within bores 228, 230 of the first segment 204 and within bore 236 of the second segment 206 to couple the first and second segments 204, 206 and to enable rotation of the second segment 206 between housing sides 174, 176 about axes 226, 234. The second segment 206 of the folding door 200 also has a fork portion 240 which defines an axis 242 extending therethrough and which defines bores 244, 246 about axis 242.

Figure 19:
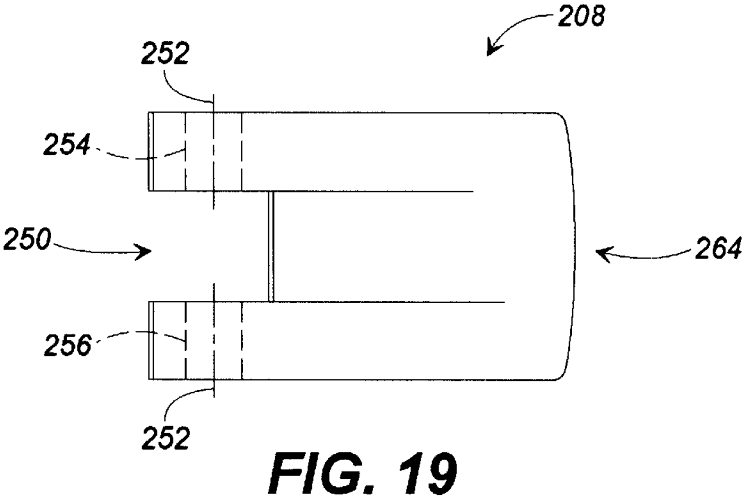
FIG. 19 is an isolated, top, plan view of a third segment of the folding door of FIGS. 9 and 11.
Figure 20:
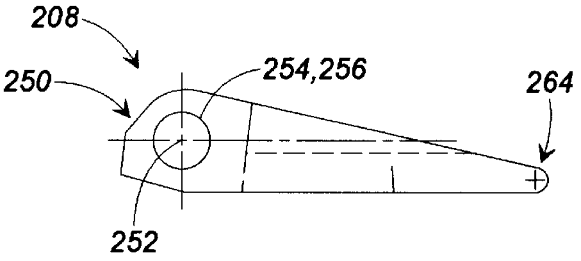
FIG. 20 is an isolated, right side, elevational view of the third segment of the folding door of FIG. 19.
Figure 21:
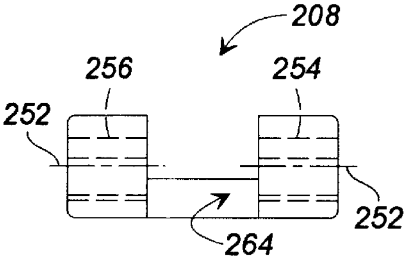
FIG. 21 is an isolated, back, elevational view of the third segment of the folding door of FIG. 19.

The third segment 208 (see FIGS. 19–21 for detailed views) of the folding door 200 has a fork portion 250 which defines an axis 252 extending therethrough and bores 254, 256 about the axis 252. The fork portion 250 of the third segment 208 resides between the forks of the fork portion 240 of the second segment 206 with axes 242, 252 in coaxial alignment. A rod 258 extends within bores 244, 246 of the second segment 206 and within bores 254, 256 of the third segment 208 to couple the second and third segments 206, 208 and to allow rotation of the second and third segments 206, 208 between housing sides 174, 176 about axes 242, 252. A spring 260 resides about axes 242, 252 and biases the second and third segments 206, 208 of the folding door 200 in a first orientation, as seen in FIGS. 9 and 11, where the second and third segments 206, 208 lie within a common plane 262. The third segment 208 of the folding door 200 has an end 264 distant from bores 254, 256 which is proximate the trap door 202 when the revolving door 170 is in its first orientation relative to the housing 104.

Figure 22:
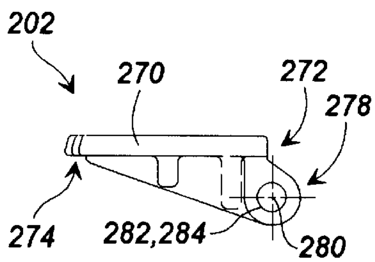
FIG. 22 is an isolated, right side, elevational view of the trap door of FIGS. 9 and 11.
Figure 23:
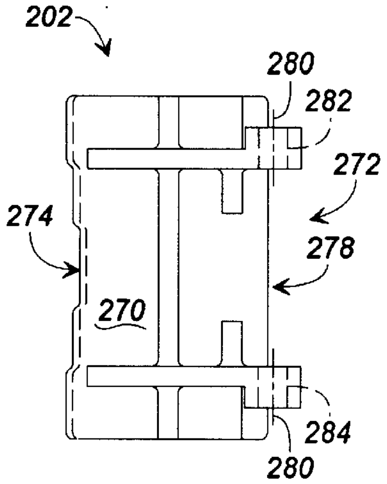
FIG. 23 is an isolated, bottom, plan view of the trap door of FIG. 22.
Figure 24:
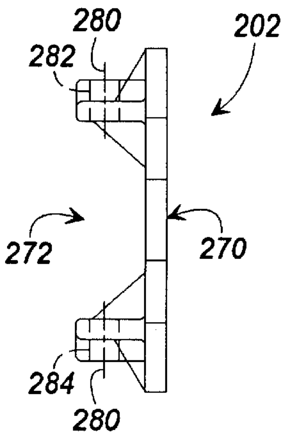
FIG. 24 is an isolated, back, elevational view of the trap door of FIG. 22.
Figure 25:
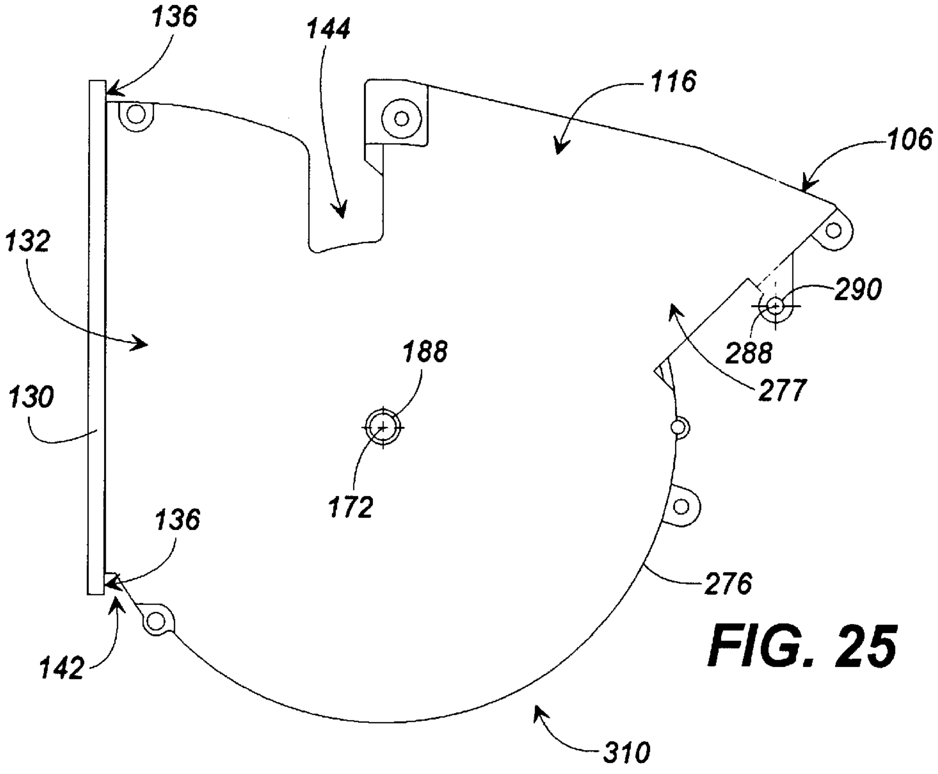
FIG. 25 is an isolated, right side, elevational view of a right side portion of the housing of FIG. 1.
Figure 26:
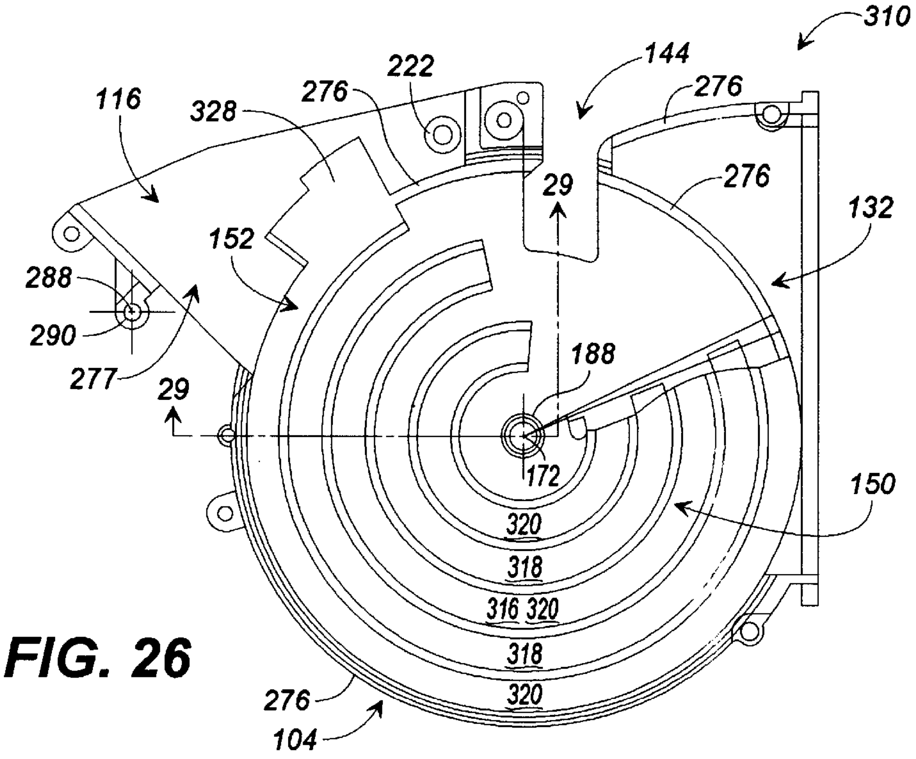
FIG. 26 is an isolated, left side, elevational view of the right side portion of the housing of FIG. 25.
Figure 27:
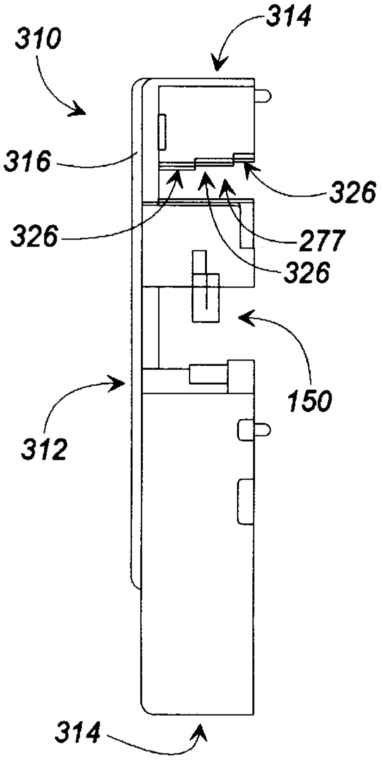
FIG. 27 is an isolated, back, elevational view of the right side portion of the housing of FIG. 25.
Figure 28:
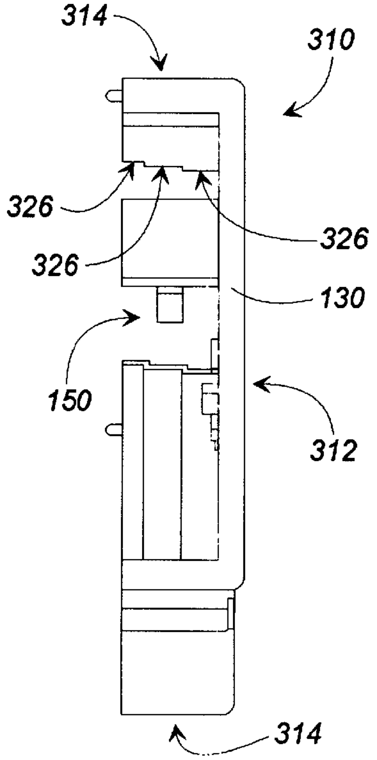
FIG. 28 is an isolated, front, elevational view of the right side portion of the housing of FIG. 25.
Figure 29:
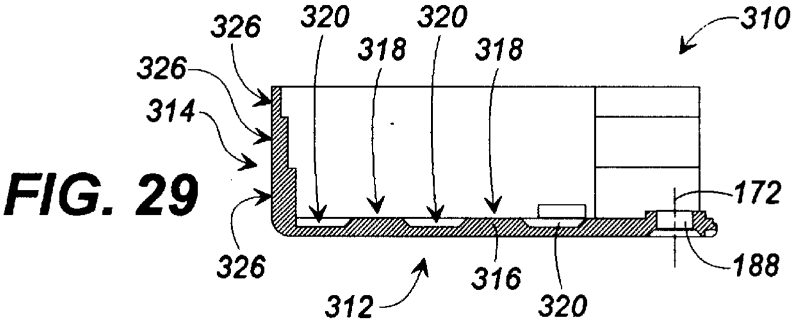
FIG. 29 is a sectional view of the right side portion of the housing of FIG. 26 taken along section lines 29—29.
Figure 30:
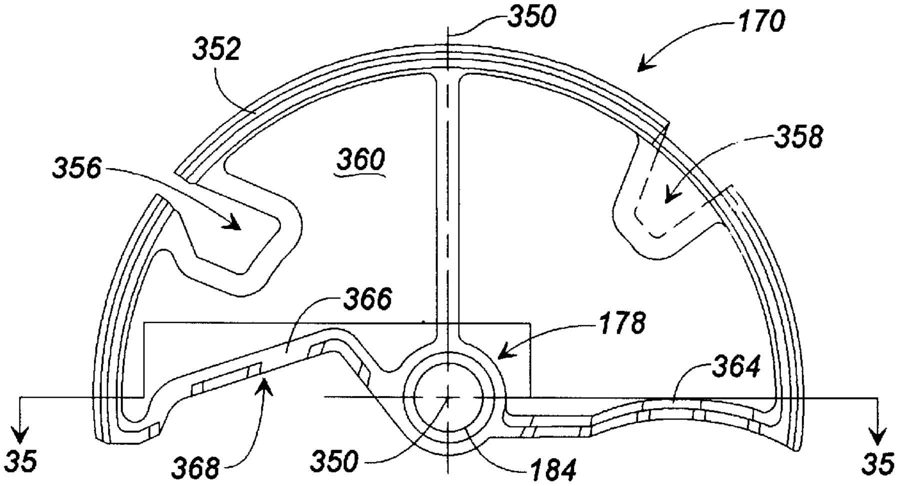
FIG. 30 is an isolated, left side, elevational view of a revolving door of the coin return device of FIG. 1.
Figure 31:
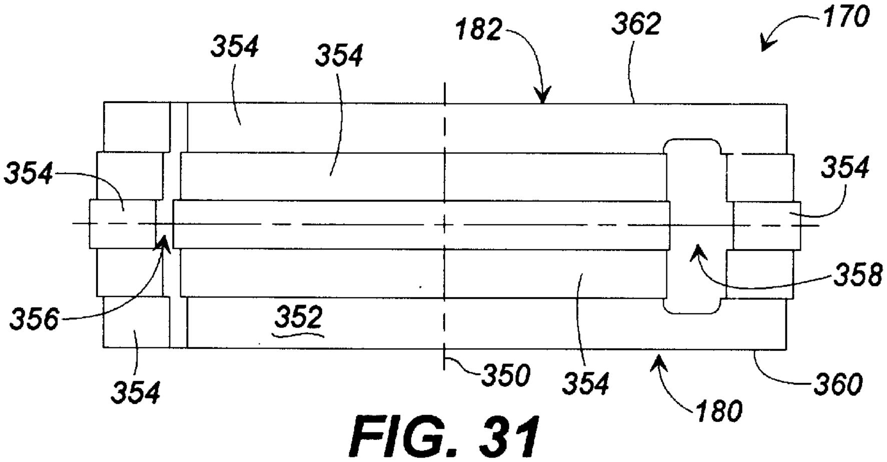
FIG. 31 is an isolated, top, plan view of the revolving door of FIG. 30.
Figure 32:
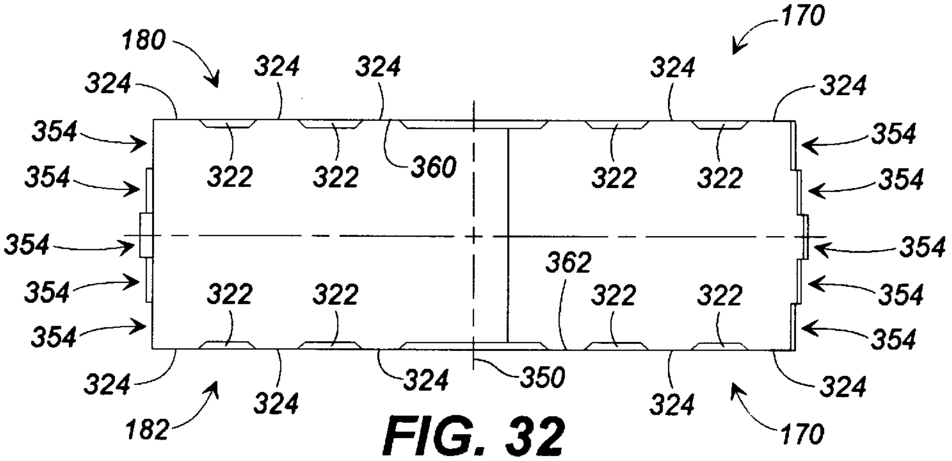
FIG. 32 is an isolated, bottom, plan view of the revolving door of FIG. 30.
Figure 33:
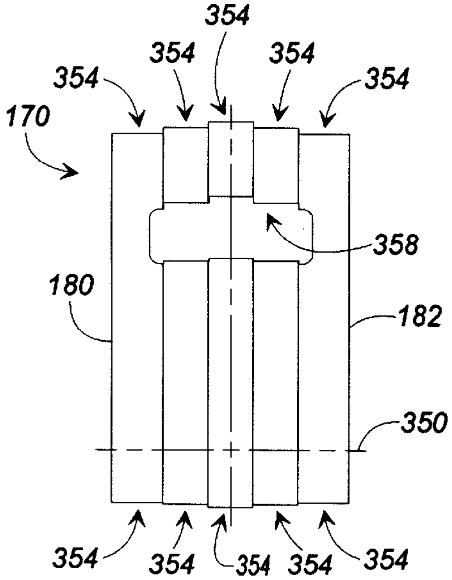
FIG. 33 is an isolated, front, elevational view of the revolving door of FIG. 30.
Figure 34:
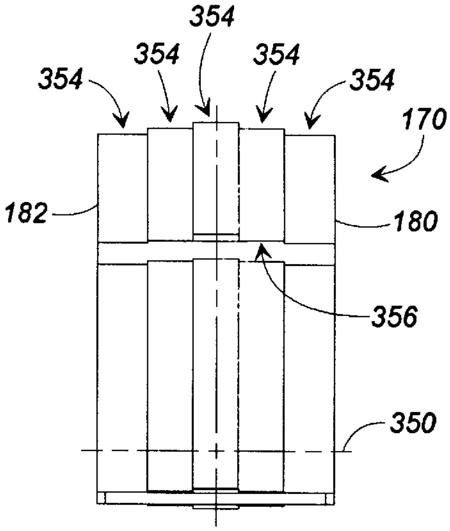
FIG. 34 is an isolated, back, elevational view of the revolving door of FIG. 30.
Figure 35:
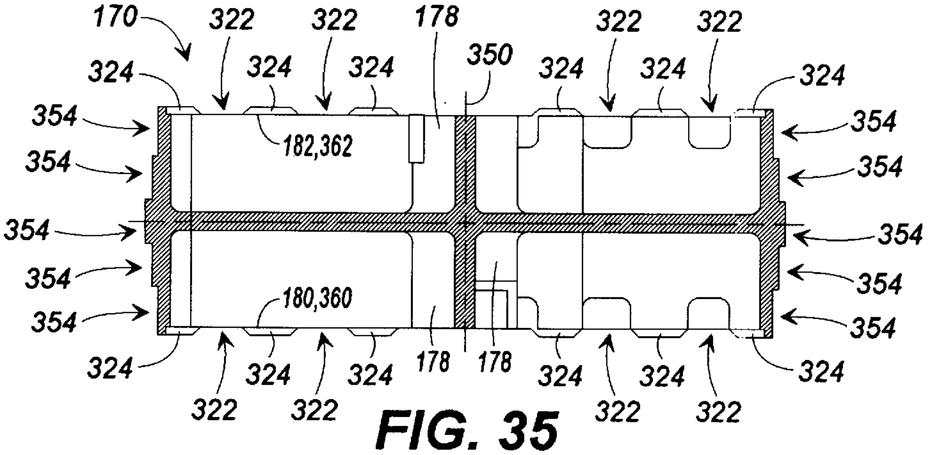
FIG. 35 is a sectional view of the revolving door of FIG. 30 taken along section lines 35—35.

The trap door 202, as seen in FIGS. 9 and 11 (see FIGS. 22–24 for detailed views), rotatably couples to the entrance chute 106 of the coin return device 100 near the second opening 152 of the entrance chute 106. The trap door 202 comprises a panel 270, extending between trap door ends 272, 274, which aligns with a rear portion of wall 276 of the entrance chute 106 and resides within opening 277 of the housing 104 when the trap door 202 is in its closed position as illustrated in FIGS. 9 and 11. At end 272, the trap door 202 has a forked portion 278 which defines an axis 280 therethrough. The forked portion 278 defines bores 282, 284 which extend about axis 280. The entrance chute portion 106 of the housing 104 defines an axis 288 and bores 290, 292 about axis 288. A rod 294 extends within trap door bores 282, 284 and within entrance chute bores 290, 292 to couple the trap door 202 to the housing 104 and to enable rotation of the trap door 202 relative to colinearly-aligned axes 280, 288 in the clockwise and counterclockwise directions indicated, respectively, by arrows 295, 296. In its closed position, illustrated in FIGS. 9 and 11, end 274 of the trap door 202 resides slightly within the second opening 152 of the entrance chute 106. A spring 298 biases the trap door 202 relative to the entrance chute 106 to maintain the trap door 202 normally in its closed position.

In accordance with the second preferred embodiment, the housing 104 comprises a right side portion 310 and a left side portion 311 (see FIG. 10) which are substantially mirror images of one another. FIGS. 25–29 display various views of the right side portion 310 of the housing 104. The right side portion 310 has a wall 276 which defines side and laterally-extending portions 312, 314 of the right side 174 of the housing 104 of the coin return device 100. In the chamber area of the side portion 312, an inside surface 316 of wall 276 defines a first plurality of lands 318 and a plurality of grooves 320 which are substantially concentric at various radii about axis 172 of the housing 104 with one groove 320 being located between an adjacent pair of lands 318. The first plurality of lands 318 and the plurality of grooves 320 cooperate with opposing respective grooves 322 and lands 324 of the revolving door 170, described below, to aid in guiding rotation of the door 170 about axis 172 and to aid in preventing shims (i.e., introduced into the coin return device 100 by thieves and/or vandals) and return coins from jamming rotation of the door 170. In the chamber area of the laterally-extending portions 314, the inside surface 316 of the wall 276 defines a second plurality of lands 326 laterally offset at terraced radii relative to axis 172 of the housing 104. The lands 326 of the second plurality of lands 326 cooperate with opposing laterally offset, terraced lands 354 of the revolving door 170 to aid in guiding smooth rotation of the revolving door 170 and to aid in preventing shims and return coins from jamming rotation of the door 170. The right side portion 310 of the housing 104 also defines a recessed area 328 which cooperates with segments of the folding door 200.

Referring now to FIGS. 30–35, the revolving door 170 defines a laterally-extending axis 350 between sides 180, 182 which is coaxial with axis 172 of the housing 104. The revolving door 170 comprises an outer wall 352 forming a first plurality of lands 354 which are laterally offset, in the direction of axis 350, at terraced radii relative to axis 350. The outer wall 352 defines a first notch 356 which extends, in the direction of axis 350, between sides 180, 182 of the revolving door 170 and in a substantially inward radial direction toward axis 350. The first notch 356 cooperates with notch 144 of the housing 104 during installation of the coin return device 100 by aligning with notch 144 to temporarily receive a portion of the front face plate 138 of the pay telephone 102. The outer wall 352 also defines a second notch 358 which extends, in the direction of axis 350, partially between sides 180, 182 of the revolving door 170 and in a substantially inward radial direction toward axis 350. The second notch 358 is accessible to a user of the pay telephone 102 through the discharge opening 132 and receives the tip of a user's finger during operation of the coin return device 100 as described below.

The revolving door 170 further comprises side walls 360, 362 at sides 180, 182 and inside walls 364, 366. The side walls 360, 362 and inside walls 364, 366 define a second plurality of lands 324 and a plurality of grooves 322 at appropriate distances from axis 350 to enable their respective cooperation with the plurality of grooves 320 and the first plurality of lands 318 of the right side portion 310 of the housing 104 and with substantially similar lands and grooves of the left side portion 312 of the housing 104. Inside wall 366 also defines a recess 368 which sometimes receives the folding door 200 during operation of the coin return device 100.

Figure 36:
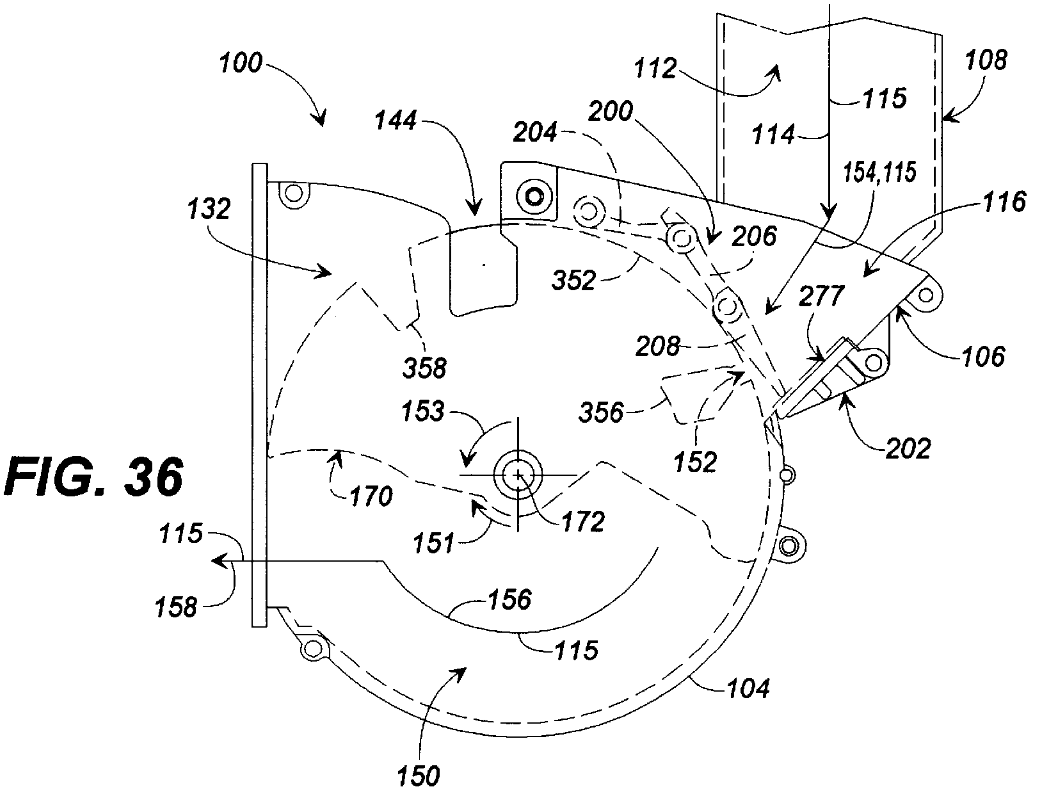
FIG. 36 is a partial, right side, schematic view of the coin return device and coin return chute of FIG. 1, showing the components of the coin return device in a first orientation.

According to a method of the second preferred embodiment, the coin return device 100 defines, as seen in the schematic view of FIG. 36, a first orientation of its components prior to interaction between the pay telephone 102 and a user of the pay telephone 102 (i.e., at a first time). In the first orientation, the revolving door 170 of the coin return device 100 resides in housing 104, with its second notch 358 oriented near the top of the discharge opening 132, with a portion of its outer wall 352 entirely blocking the second opening 152 of the entrance chute 106 (i.e., thereby making the entrance chute 106 and the coin return chute 108 non-communicable with the chamber 150 and with the discharge opening 132), and with chamber 150 being accessible to the user through the discharge opening 132. Also, the folding door 200 rests substantially against a portion of the outer wall 352 and the trap door 202 entirely blocks opening 277 of the housing's entrance chute 106. Note that, in the first orientation, the outer wall 352 of the revolving door 170 and the folding door 200 break the coin return path 115 into discontinuous segments (i.e., a first segment including portions 114, 154 of the coin return path 115 and a second segment including portions 156, 158) with only the second segment of the coin return path 115 (i.e., and, hence, return coins within chamber 150) being accessible to a user.

Then, upon insertion of coin(s) into a coin receiving slot of the pay telephone 102 by the user, the coin validator determines whether each inserted coin is acceptable (i.e., not a slug, not an unacceptable coin of a foreign country, etc.) or not acceptable. If a coin is not acceptable (i.e., and, hence, termed herein as a "rejected coin"), the coin validator directs the rejected coin into the coin reject chute 108 where it falls, under the influence of gravity, through channel 122 along portion 124 of the coin return path 115 and into channel 112 of coin return chute 108. If a coin is acceptable (i.e., and, hence, termed herein as an "accepted coin"), the coin validator directs the accepted coin into the coin escrow device 110 for temporary storage until either (1) the user's telephone call is successfully completed and the accepted coins are directed toward a coin receptacle (not shown) for storage until collected by a representative of the pay telephone's owner, or (2) the user's telephone call is not successfully completed and the user either hangs-up the telephone's handset or operates the telephone's hookswitch to cause the coin escrow device 110 to release and direct the accepted coins into channel 112 of the coin return chute 108. Note that together, any rejected coins and any accepted, but released coins (i.e., released by the coin escrow device 110) which travel through channel 112 of the coin return chute 108 are referred to herein as "return coins".

Upon introduction into channel 112 of the coin return chute 108, return coins are guided along a portion 114 of the coin return path 115, in the direction of the arrows, into the entrance chute 106 of the coin return device 100 through the entrance chute's first opening 116. Once within the entrance chute 106, the return coins collect atop the folding door 200. The user, desiring to recover the return coins, places the tip of a finger through the discharge opening 132 of the coin return device's housing 104 and into the second notch 358 of the revolving door 170. In response to the application of a, generally, downward tangential force, by the user, to the outer wall 352 in the proximity of the second notch 358, the revolving door 170 rotates in a counterclockwise direction, indicated by arrow 153, about axis 172 of the housing 104. Upon continuing receipt of the, generally, downward tangential force, the revolving door 170 continues its rotation in the counterclockwise direction with the second notch 358 getting increasingly nearer the bottom of the discharge opening 132, with the outer wall 352 of the revolving door 170 blocking increasingly more of the discharge opening 132 (i.e., thereby increasingly blocking user access to the chamber 150 within the coin return device 100 through the discharge opening 132 of the housing 104), and with the outer wall 352 blocking decreasingly less of the entrance chute's second opening 152.

Figure 37:
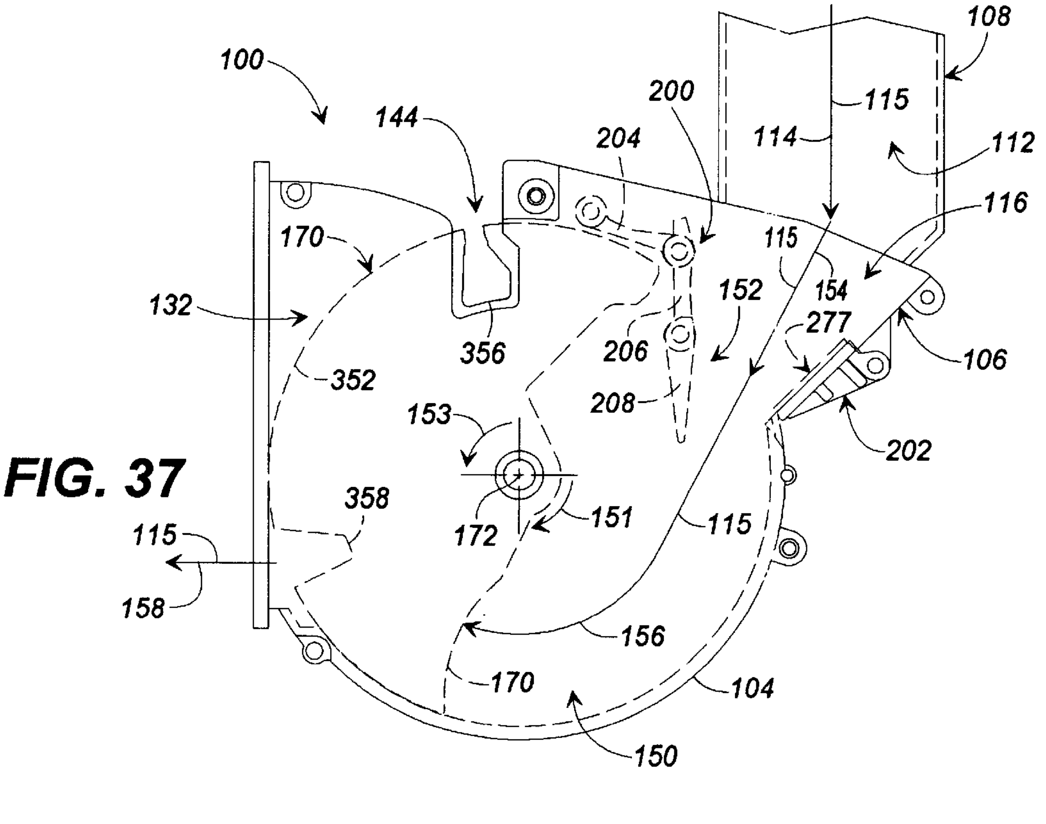
FIG. 37 is a partial, right side, schematic view of the coin return device and coin return chute of FIG. 1, showing the components of the coin return device in a second orientation.
Figure 38:
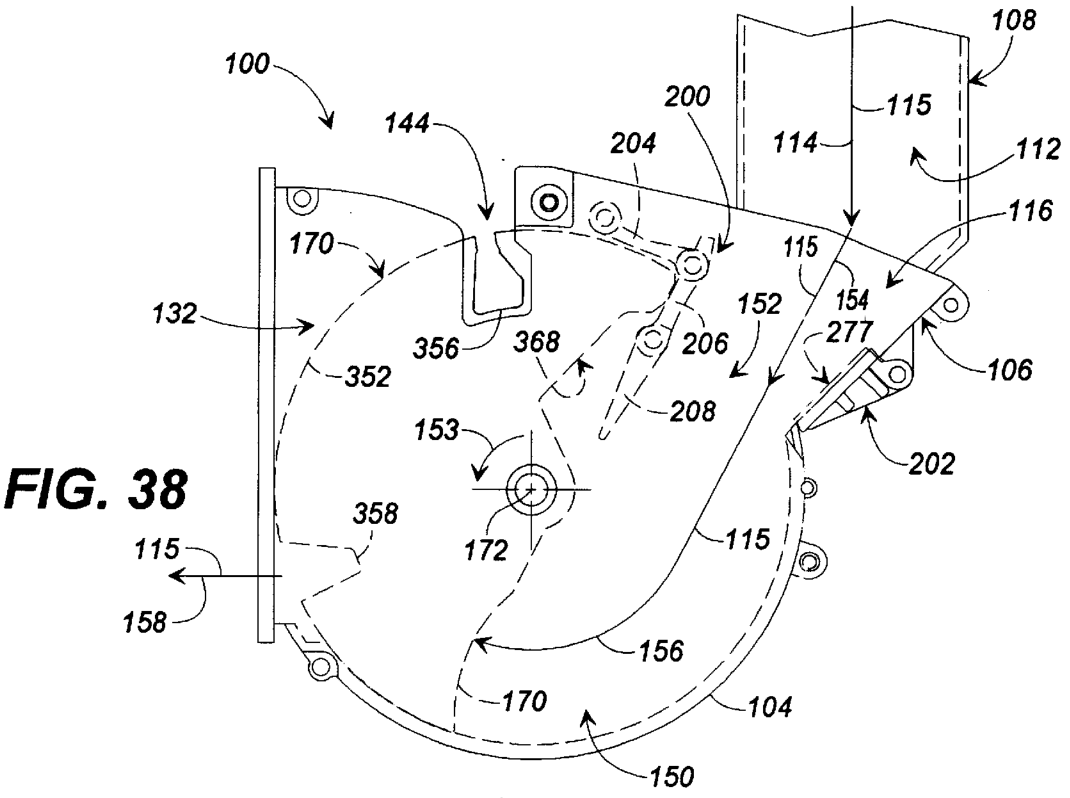
FIG. 38 is a partial, right side, schematic view of the coin return device and coin return chute of FIG. 1, showing the components of the coin return device in a variant of the second orientation.

When the user can no longer cause continued counterclockwise rotation of the revolving door 170 (i.e., when the second notch 358 is positioned substantially near the bottom of the discharge opening 132), the components of the coin return device 100 are positioned in a second orientation, at a second time, as shown schematically in FIG. 37. In the second orientation, the first notch 356 of the revolving door 170 aligns with notch 144 of the housing 104 and a portion of the outer wall 352 entirely blocks the discharge opening 132, thereby rendering the chamber 150, the entrance chute 106, and channel 122 of the coin return chute 108 inaccessible to the user via the discharge opening 132. Also, the outer wall 352 no longer blocks the second opening 152 of the entrance chute 106, and the second and third segments 206, 208 of the folding door 200 extend in a substantially downward vertical direction into chamber 150 after having pivoted relative to the first segment 204 due to the removal of support from the outer wall 252 and the combined weight of return coins previously residing atop the door 200 in the entrance chute 106 and the weight of the door 200 itself applying a downward force on the folding door 200. Note that, in the second orientation, the revolving door 170 breaks the coin return path 115 into discontinuous segments (albeit segments comprising different portions than in the first orientation) with portions 114, 154, 156 (i.e., a first segment) of the path 115 not being accessible to the user through the discharge opening 132 and portion 158 (i.e., a second segment) of the path 115 being accessible to a user. In the second orientation, the chamber 150 is in communication with the entrance chute 106 and channel 122 of the coin return chute 108, thereby enabling, with the folding door 200 extending downward, return coins to fall into the chamber 150 from the entrance chute 106 and the coin return chute 108. Note also that should a substantial number of return coins be present within the entrance chute 106 and/or coin return chute 108, the second and third segments 206, 208 of the folding door 200 are pivotable, as depicted in FIG. 38, into recess 368 of the revolving door 170 (i.e., defining a variant of the second orientation of the coin return device 100).

Once the user is satisfied that return coins are present within the chamber 150 of the coin return device 100, the user removes the tip of his/her finger from the second notch 358 of the revolving door 170. In response to removal of the user's finger, spring 192 causes the revolving door 170 to rotate in a clockwise direction, indicated by arrow 151, about axis 172 of the housing 104 until the revolving door 170 and the other components of the coin return device 100 return to the arrangement of their first orientation shown in FIG. 36. During the clockwise rotation of the revolving door 170, the second notch 358 of the revolving door 170 becomes increasingly nearer the top of the discharge opening 132 and the outer wall 352 of the revolving door 170, while blocking increasingly more of the second opening 152 of the entrance chute 106, presses generally upward on the segments 204, 206, 208 of the folding door 200 to return the folding door 200 to its position in the first orientation of the coin return device 100.

Note that, due, in part, to the sizing, spacing, and spatial arrangement of the components of the coin return device 100 and due, in part, to the movement of the revolving door 170 relative to the housing 104, a direct, continuous, uninterrupted, unsegmented coin return path 115 is never present between the discharge opening 132 and the first opening 116 of the entrance chute 106 (i.e., nor between the discharge opening 132 and channel 122 of the coin return chute 108). Because no such continuous, unsegmented coin return path 115 is ever present, the coin return device 100 renders it extremely difficult, if not impossible, for a thief to introduce a foreign object into the coin return chute 108 via the discharge opening 132. Should a thief attempt to "stuff" the pay telephone 102, the thief will discover that the foreign object cannot be introduced any farther than the chamber 150 because the lack of a direct, continuous, unsegmented coin return path 115 created by the coin return device's "airlock" design does not allow the foreign object to be pushed into the coin return chute 108 even upon rotation of the revolving door 170. A customer desiring to use the pay telephone 102 might notice the foreign object (i.e., as the foreign object may likely be visible through discharge opening 132) and either not use the telephone 102 or remove the foreign object before using the telephone 102. Should a thief attempt to introduce a foreign object into the coin return chute 108 by employing a "stringing" technique, the folding door 200, when in its second orientation shown in FIG. 37 (i.e., which would necessarily be the door's orientation when the thief attempts to pull the foreign object into the coin return chute 108) and as proven by experimentation, substantially resists the pulling of a foreign object upward through the second opening 152 of the entrance chute 106 (i.e., because spring 260 locks the second and third segments 106, 208 of door 200 in plane 262 enabling the tip to segment 208 of the folding door 200 to engage the foreign object and resist its upward travel), thereby causing the foreign object to remain and be detectable in chamber 150 when the revolving door 170 and folding door 200 return to their positions of the first orientation. Note that, in an alternate embodiment, a string cutter is employed in the entrance chute 106 to prevent repeated "stringing" attempts.

Figure 39:
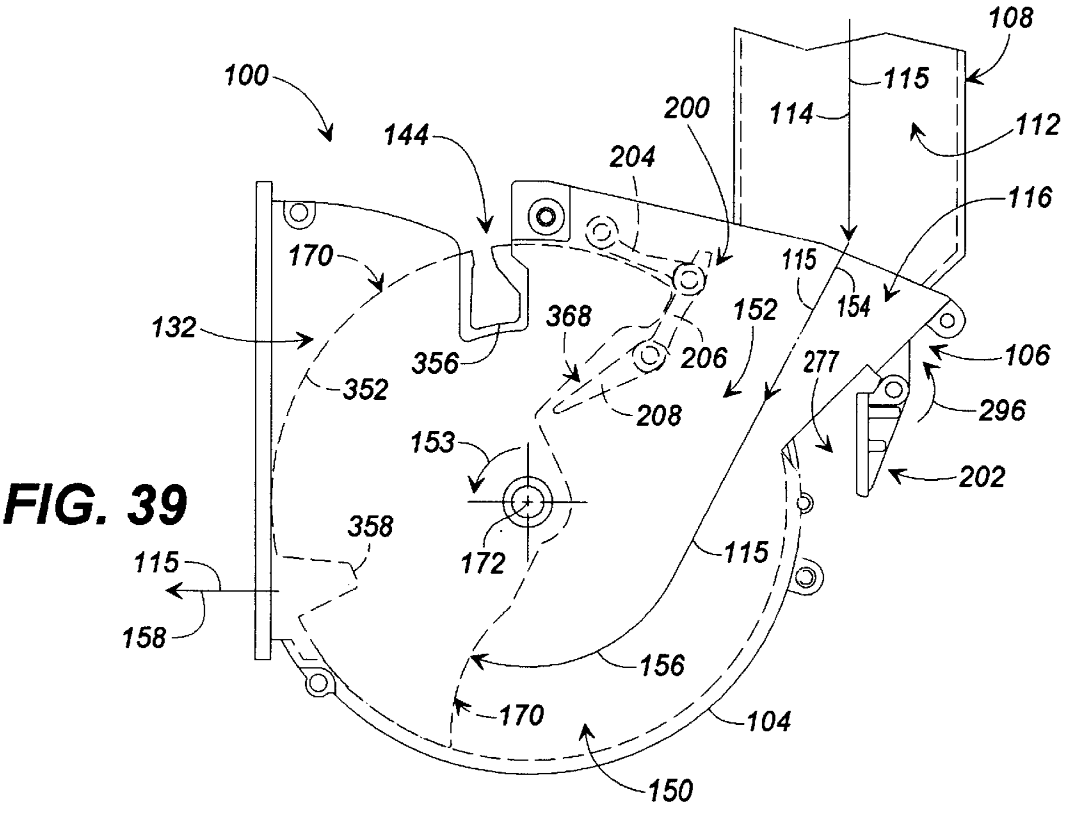
FIG. 39 is a partial, right side, schematic view of the coin return device and coin return chute of FIG. 1, showing the components of the coin return device in a variant of the second orientation.

Also, note that should the coin return device 100, for some reason, become jammed with return coins (i.e., which may be possible, although not very likely, when a substantial number of coins attempt to fall through the second opening 152 of the entrance chute 106), the second and third segments 206, 208 of the folding door 200 pivot relative to one another (i.e., defining a variant of the coin return device's second configuration), upon successive clockwise and counterclockwise rotations of the revolving door 170, in order to aid in clearing the jam (see FIG. 39). In addition, the trap door 202 is rotatable in a substantially a counterclockwise direction, as indicated by arrow 296, into an open position (see FIG. 39), thereby allowing return coins to fall through opening 277 of the housing 104 and into other portions of the pay telephone 102 in order to assist in breaking the jam. Upon clearing of the jam and releasing of the revolving door 170 by the user, the folding door 200 and the trap door 202 return to their positions of the first orientation of the coin return device 100.

Additionally, should a vandal insert and detonate fireworks within chamber 150, the coin return device 100 resists damage to itself and to sensitive components of the pay telephone 102. In the event that the fireworks detonate with the revolving door 170 in the first orientation, a substantial portion of the energy released by the detonation is directed through the discharge opening 132 and, hence, away from the pay telephone 102. In the event that the revolving door 170 is somehow held (i.e., to overcome the force exerted by spring 192 tending to always return the revolving door 170 to the first orientation) in the second orientation when the fireworks detonate, the revolving door 170 rotates somewhat in either a clockwise or counterclockwise direction, the folding door 200 rotates somewhat in a substantially counterclockwise direction away from the second opening 152 of the entrance chute 106, and the trap door 202 rotates somewhat in a substantially counterclockwise direction away from opening 277 of the housing 104 to aid in dissipating energy which might, otherwise, be transmitted, via shock waves traveling in a substantially upward direction through the coin return chute 108, to sensitive components of the pay telephone 102.

Note that the various components of the coin return device 100 (including, particularly, the entrance chute first and second openings 116, 152, the folding door 200, the trap door 202, the chamber 150, and the discharge opening 132) are appropriately sized and positioned to enable the coin return device 100 to return large coins having diameters (or, other maximum dimensions) of at least 35 millimeters, as well as smaller coins having lesser diameters (or, other maximum dimensions), to a pay telephone's user.

While the invention has been disclosed in the form of a coin return device 100 having a revolving door 170 as the movable door, it is understood that the scope of the present invention encompasses use of a door which moves in a linear, reciprocating manner. Such a reciprocating door could still provide indirect access to the coin hopper 1, or entrance chute 106, whereby user access to the coin hopper 1 would be blocked whenever user access is provided to the coin return chamber 150.

While the invention has been disclosed in preferred embodiments, it will be apparent to those reasonably skilled in the art that many modifications, additions and deletions can be made therein without departing from the spirit and scope of the present invention as set forth in the following claims.

I claim:

1. A coin return apparatus for use with a pay telephone, said coin return apparatus comprising:

a housing mountable within the pay telephone, said housing having a chamber therein, a first opening communicable with a passageway of a coin return structure of the pay telephone and selectively communicable with said chamber, and a second opening communicable with the environment about the pay telephone and selectively communicable with said chamber; and, movable door mounted to said housing, said movable door being movable between first and second positions relative to said housing, wherein the presence of said movable door in said first position enables removal of coins present in said chamber through said second opening and disables passage through said first opening from said chamber, and wherein the presence of said movable door in said second position enables delivery of coins into said chamber through said first opening and disables passage through said second opening to said chamber.

2. The coin return apparatus of claim 1 wherein said coin return apparatus further comprises means for hindering movement of a foreign object through said first opening of said housing.

3. The coin return apparatus of claim 2 wherein said movable door is a first movable door and said means for hindering movement comprises a second movable door positionable between first and second orientations relative to said first opening of said housing, wherein said second movable door in said first orientation substantially occludes said first opening of said housing and said second movable door in said second orientation extends into said chamber of said housing.

4. The coin return apparatus of claim 1 wherein said coin return apparatus further comprises means for impeding the wedging of a foreign object between said housing and said movable door.

5. The coin return apparatus of claim 4 wherein said means for impeding comprises a plurality of lands of said housing and a plurality of grooves of said movable door, said plurality of lands being cooperative with said plurality of grooves.

6. The coin return apparatus of claim 4 wherein said means for impeding comprises a plurality of grooves of said housing and a plurality of lands of said movable door, said plurality of lands being cooperative with said plurality of grooves.

7. The coin return apparatus of claim 1 wherein said coin return apparatus further comprises means for enabling movement of said movable door between said first position and said second position.

8. The coin return apparatus of claim 7 wherein said means for enabling movement comprises a recess of said movable door accessible to a user from outside said coin return apparatus.

9. The coin return apparatus of claim 1 wherein said coin return apparatus further comprises means for clearing jammed coins from said housing.

10. The coin return apparatus of claim 9 wherein said housing has a third opening therein and said means for clearing jammed coins comprises a trap door selectively covering said third opening.

11. The coin return apparatus of claim 1 wherein said movable door is pivotally connected to said housing.

12. The coin return apparatus of claim 11 wherein said movable door comprises a revolving door mounted within said housing.

13. A coin return apparatus for use with a pay telephone, said coin return apparatus comprising:

a first member fixedly mountable within the pay telephone; and, a second member cooperative with and movable relative to said first member, said first and second members defining a chamber therebetween, said chamber being selectively communicable with a passageway of a coin return structure of the pay telephone and selectively communicable with the environment about the pay telephone, said second member placing said chamber in exclusive communication with the passageway of the coin return structure at a first time and in exclusive communication with the environment at a second time different from the first time, said second member opposing communication between the passageway of the coin return structure and the environment at a same time.

14. The coin return apparatus of claim 13 wherein said first member and said second member are coupled for relative rotary motion therebetween.

15. The coin return apparatus of claim 14 wherein said coin return apparatus further comprises a biasing means for causing relative rotary motion between said first member and said second member, said biasing means being connected to said first member and to said second member.

16. The coin return apparatus of claim 15 wherein said biasing means comprises means for returning said chamber into communication with the environment about the pay telephone after said chamber has been out of communication with the environment about the pay telephone.

17. The coin return apparatus of claim 14 wherein said second member resides within said first member.

18. The coin return apparatus of claim 13 wherein said coin return apparatus further comprises a first opening and a second opening therein, said first opening being selectively communicable with the passageway of the coin return structure of the pay telephone and said second opening being selectively communicable with the environment about the pay telephone, and wherein said second member selectively blocks access to said first opening and to said second opening.

19. The coin return apparatus of claim 13 wherein said coin return apparatus further comprises means for blocking passage of a foreign object through said coin return apparatus.

20. The coin return apparatus of claim 13 wherein said coin return apparatus further comprises means for thwarting wedging of a foreign object within said coin return apparatus.

21. The coin return apparatus of claim 13 wherein said coin return apparatus is insertable into the pay telephone through a coin return opening in a housing of the pay telephone.

22. The coin return apparatus of claim 13 wherein said coin return apparatus accommodates coin s therein having a maximum size dimension as large as thirty-five (35) millimeters.

23. A coin return apparatus for use with a pay telephone, said coin return apparatus comprising:

a housing mountable within the pay telephone, said housing defining a coin return path therethrough having a first segment and a second segment discontinuous from said first segment; and, means connected to and cooperative with said housing for selectively making said first segment accessible from outside said housing at a first time and for selectively making said second segment accessible from outside said housing at a second time different from said first time, said first and second segments not being accessible from outside said housing at a same time.

24. The coin return apparatus of claim 23 wherein said means for selectively making is positionable by a user to make said first segment of said coin return path continuous with a coin return path of the pay telephone extending outside of said housing, whereby coins are delivered into the housing from a coin handling component of the pay telephone.

25. The coin return apparatus of claim 24 wherein said means for selectively making comprises a rotatable member pivotally coupled to said housing.

26. The coin return apparatus of claim 23 wherein said coin return apparatus is capable of passing coins therethrough having a maximum size dimension as large as thirty-five (35) millimeters.

27. A coin return apparatus for use with a pay telephone, said coin return apparatus comprising:

a housing defining a coin hopper and a coin return chamber positioned generally below said coin hopper; and, movable door means mounted to said housing for movement between a coin retrieval position and a coin delivery position, wherein with said movable door means in said coin retrieval position coins within said coin return chamber can be retrieved manually and access to said coin hopper is blocked, and with said movable door means in said coin delivery position access to said coin return chamber is blocked and coins can be delivered by gravity from said coin hopper to said coin return chamber.

28. The coin return apparatus of claim 27 wherein said movable door means is pivotally mounted to said housing.

29. The coin return apparatus of claim 28 wherein said movable door means comprises a revolving door.

30. The coin return apparatus of claim 27 wherein said coin return apparatus further comprises means for opposing introduction of a foreign object into said coin hopper.

* * * * *